US012291756B2

(12) United States Patent
Park

(10) Patent No.: US 12,291,756 B2

(45) Date of Patent: May 6, 2025

(54) TUYERE STOCK, METHOD OF FABRICATING THE SAME, AND AIR BLAST SYSTEM FOR MELTING FURNACE

(71) Applicants: Seung Jae Park, Seoul (KR); EXCELLO CO., LTD., Gwangyang-si (KR)

(72) Inventor: Seung Jae Park, Seoul (KR)

(73) Assignees: Seung Jae Park, Seoul (KR); EXCELLO CO., LTD., Gwangyang-si (KR)

( * ) Notice: Subject to any disclaimer, the term of this patent is extended or adjusted under 35 U.S.C. 154(b) by 434 days.

(21) Appl. No.: 17/836,995

(22) Filed: Jun. 9, 2022

(65) Prior Publication Data

US 2022/0298591 A1 Sep. 22, 2022

Related U.S. Application Data

(63) Continuation of application No. PCT/KR2022/002574, filed on Feb. 22, 2022.

(30) Foreign Application Priority Data

Feb. 25, 2021 (KR) ........................ 10-2021-0025498
Feb. 16, 2022 (KR) ........................ 10-2022-0020021

(51) Int. Cl.
*C21B 7/16* (2006.01)
*C21B 7/24* (2006.01)
(Continued)

(52) U.S. Cl.
CPC ................ *C21B 7/163* (2013.01); *C21B 7/24* (2013.01); *F27B 1/16* (2013.01); *F27B 1/28* (2013.01)

(58) Field of Classification Search
CPC .. C21B 7/163; C21B 7/24; C21B 9/10; C21B 9/16; F27B 1/16; F27B 1/28; F27D 19/00; F27D 21/00; F27D 21/001
(Continued)

(56) References Cited

U.S. PATENT DOCUMENTS 3,831,918 A * 8/1974 Mori ......................... C21B 7/16
266/270
7,566,413 B2 * 7/2009 Piret ......................... F27B 1/16
266/87

(Continued)

FOREIGN PATENT DOCUMENTS

CN 201779366 U 3/2011
CN 202175689 * 2/2012 ............. C21B 7/163

(Continued)

OTHER PUBLICATIONS

CN105506208, Tian , Energy-saving environmental-friendly blast branch pipe (Year: 2016).*

(Continued)

*Primary Examiner* — Jessee R Roe
*Assistant Examiner* — Michael Aboagye
(74) *Attorney, Agent, or Firm* — Revolution IP, PLLC

(57) ABSTRACT

An air blast system for melting furnaces includes: a supply unit supplying hot air into a melting furnace; a bustle pipe connected to the supply unit; a tuyere stock connecting the bustle pipe to the melting furnace to supply hot air from the bustle pipe to the melting furnace in a distributed manner; and a temperature management module determining whether the tuyere stock is damaged by comparing a temperature of the tuyere stock with a preset reference temperature.

9 Claims, 11 Drawing Sheets

(51) Int. Cl.
*F27B 1/16* (2006.01)
*F27B 1/28* (2006.01)

(58) Field of Classification Search
USPC .......................................... 266/47, 265, 268
See application file for complete search history.

(56) References Cited

U.S. PATENT DOCUMENTS

| | | | | |
|---|---|---|---|---|
| 8,945,463 B2 * | 2/2015 | Goedert | .................. | C21B 7/163<br>266/268 |
| 2011/0180978 A1 | 7/2011 | Goedert et al. | | |

FOREIGN PATENT DOCUMENTS

| | | | | | |
|---|---|---|---|---|---|
| CN | 105506208 | * | 4/2016 | ............. | C21B 7/163 |
| JP | 2013181202 | * | 9/2013 | ............. | C21B 7/163 |
| KR | 10-0828154 B1 | | 5/2008 | | |
| KR | 10-2011-0091357 A | | 8/2011 | | |
| KR | 10-2013-0014745 A | | 2/2013 | | |
| KR | 10-2018-0092350 A | | 8/2018 | | |
| KR | 20180092350 | * | 8/2018 | ............. | C21B 7/163 |

OTHER PUBLICATIONS

KR20180092350, Jeong, Real-time temperature and crack control (Year: 2018).*
CN202175689, Xin et al., A blast furnace pipeline of an integral casting (Year: 2012).*
JP2013181202, Miyamoto et al., The Refractory lining layer construction method and blow pipe (Year: 2013).*
European Search Report of European Patent Application No. 22726375 mailed Dec. 6, 2023.
International Search Report for PCT/KR2022/002574 filed on May 23, 2022 from Korean Intellectual Property Office.

* cited by examiner

【FIG. 1】
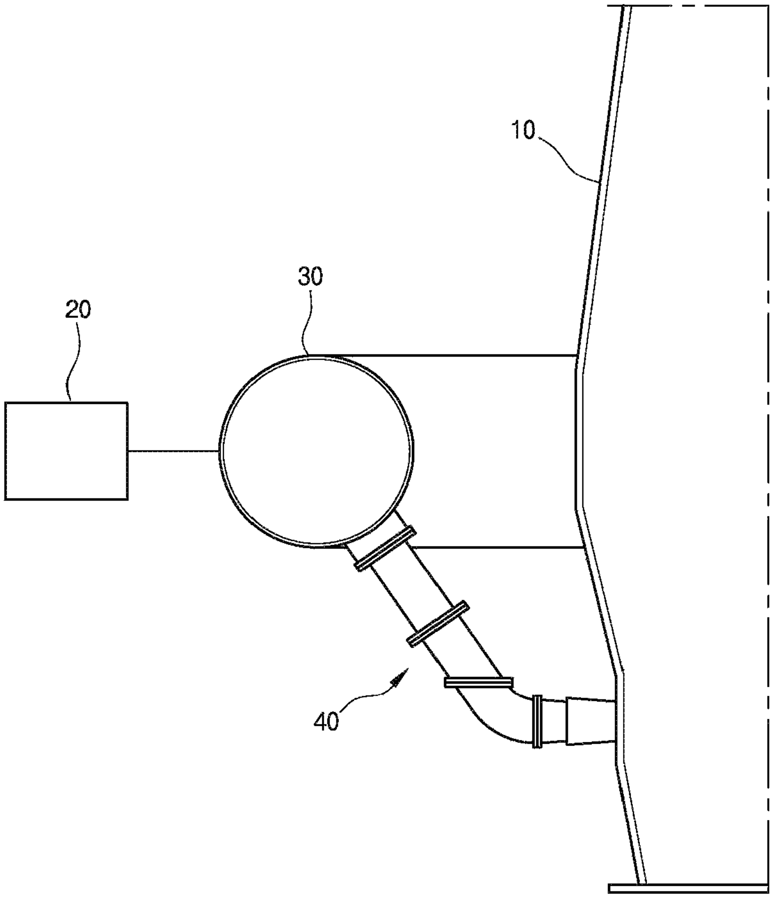

【FIG. 2】
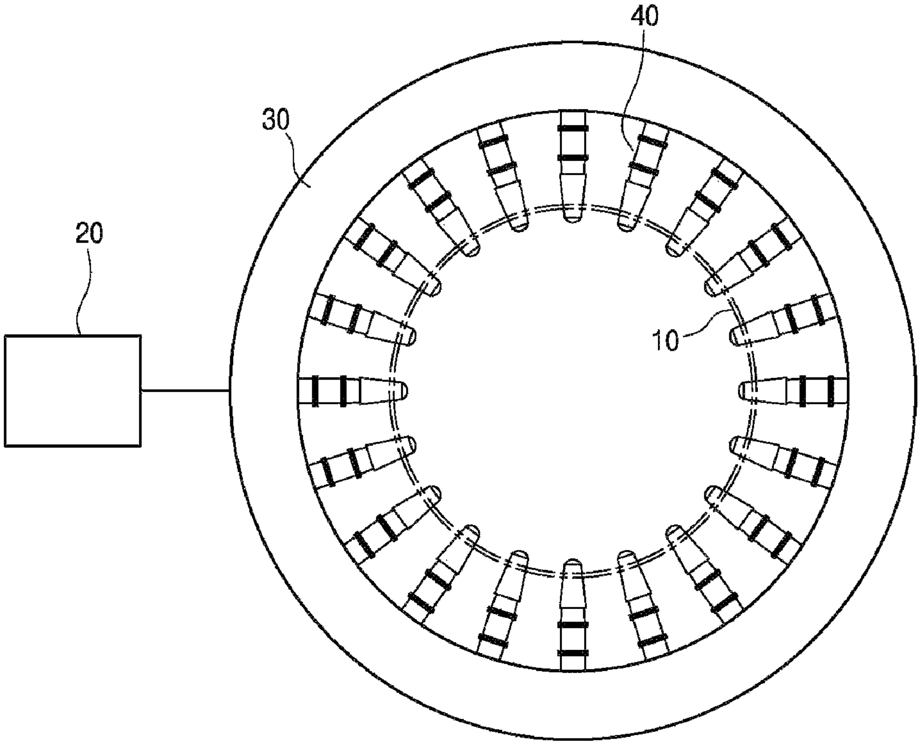

【FIG. 3】
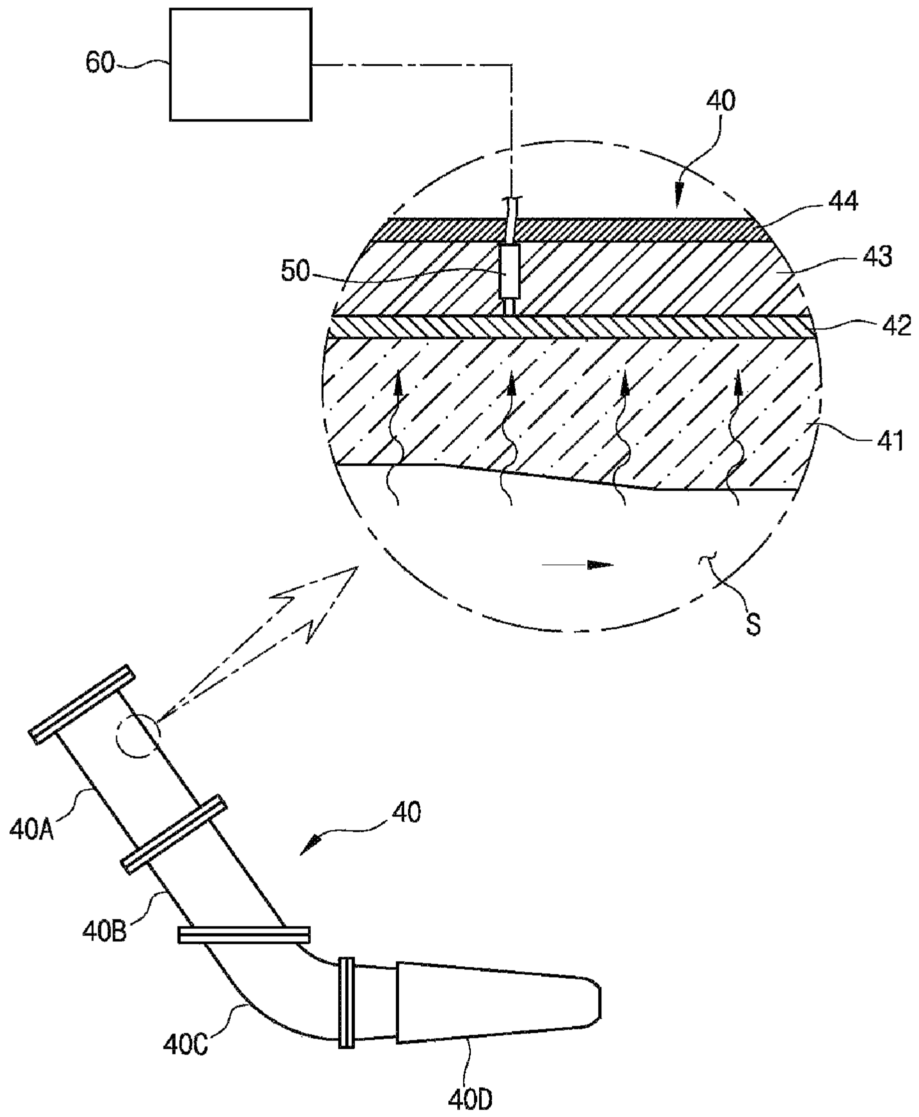

【FIG. 4】
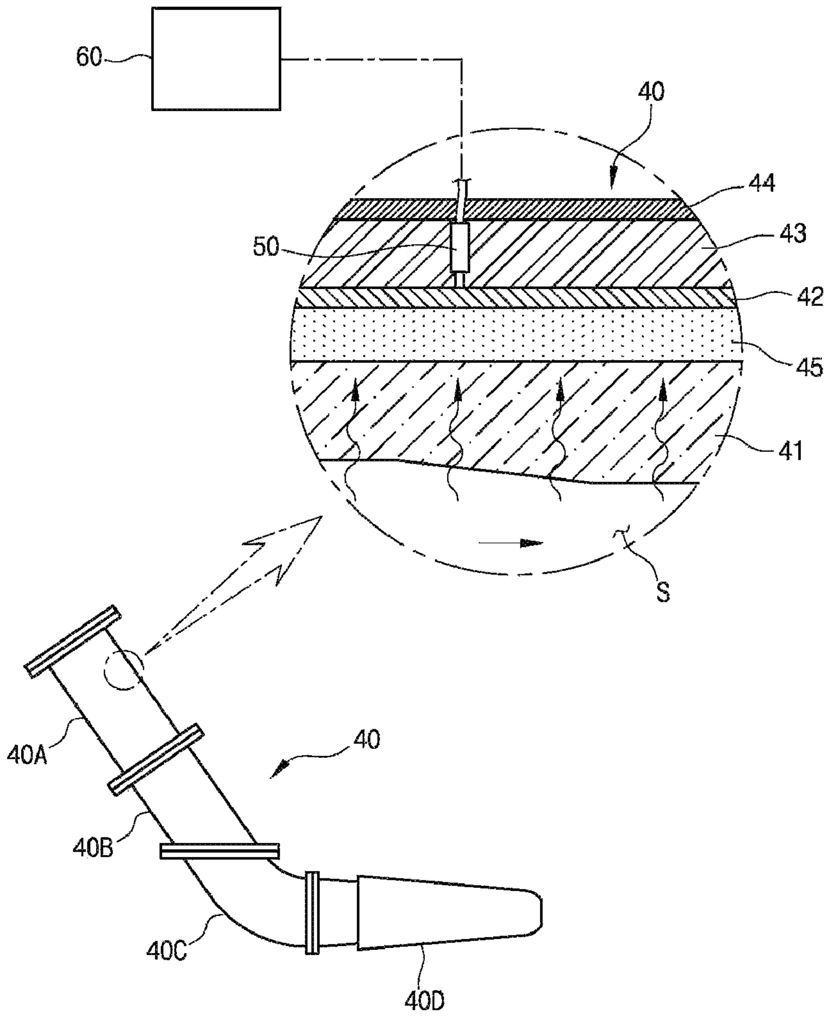

【FIG. 5】
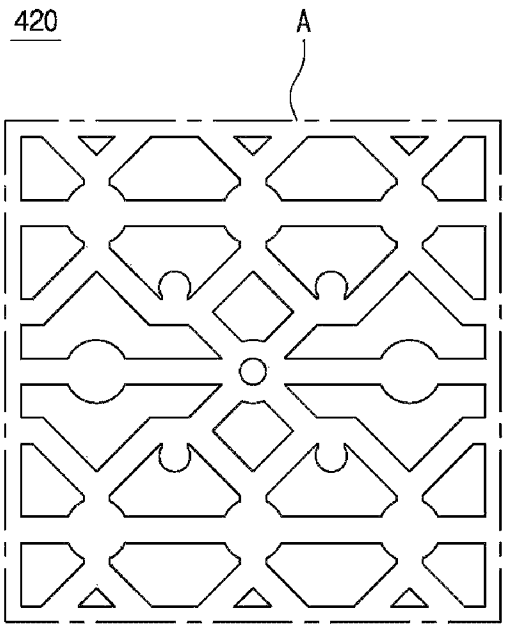

【FIG. 6】
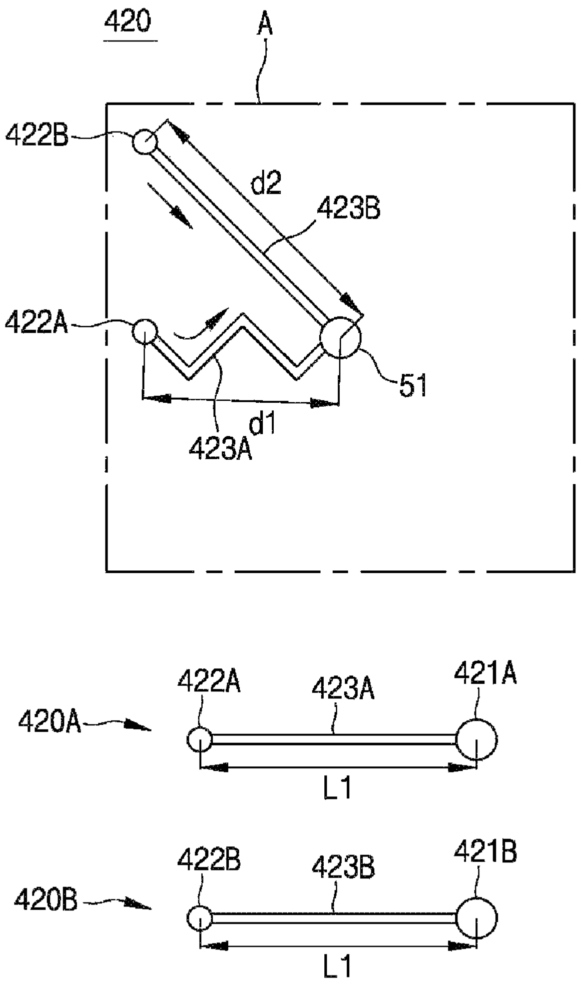

【FIG. 7】
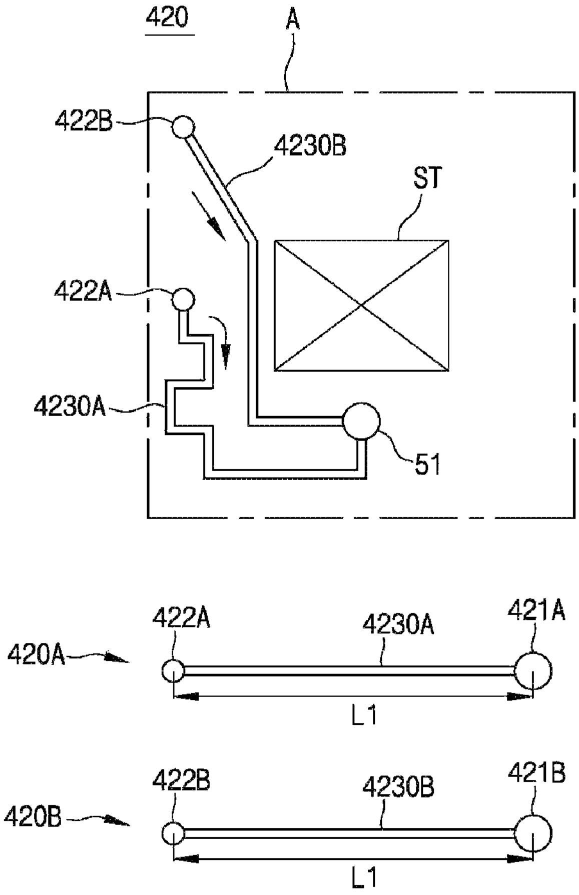

【FIG. 8】
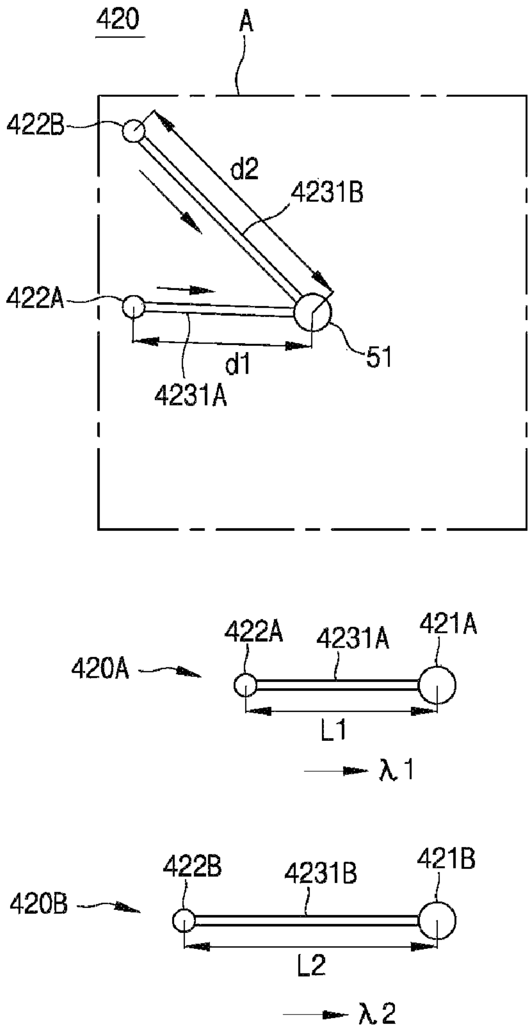

【FIG. 9】
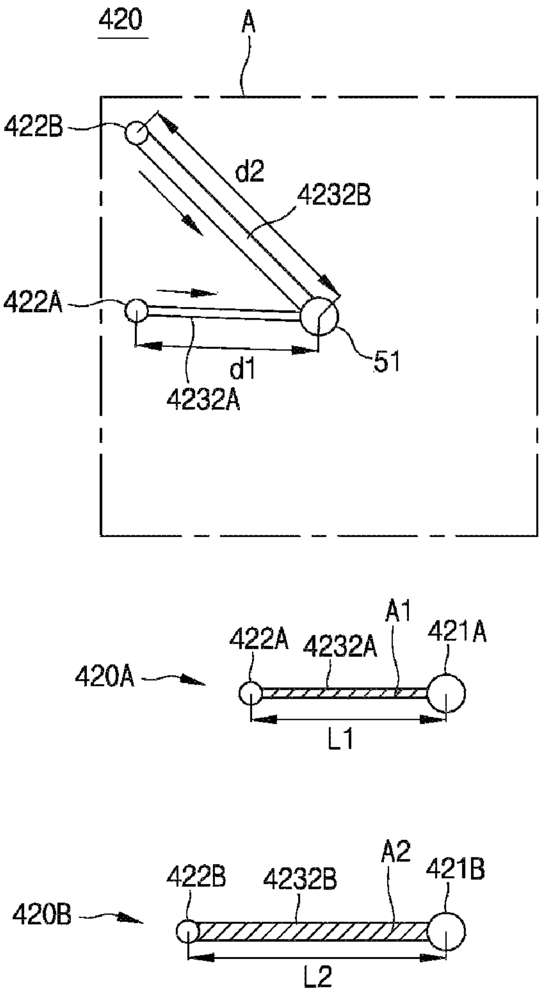

【FIG. 10】
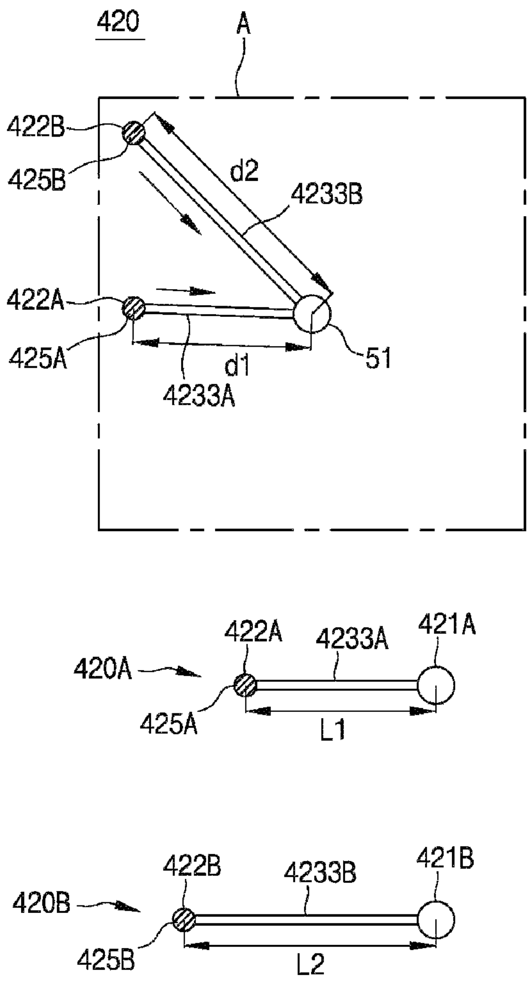

【FIG. 11】
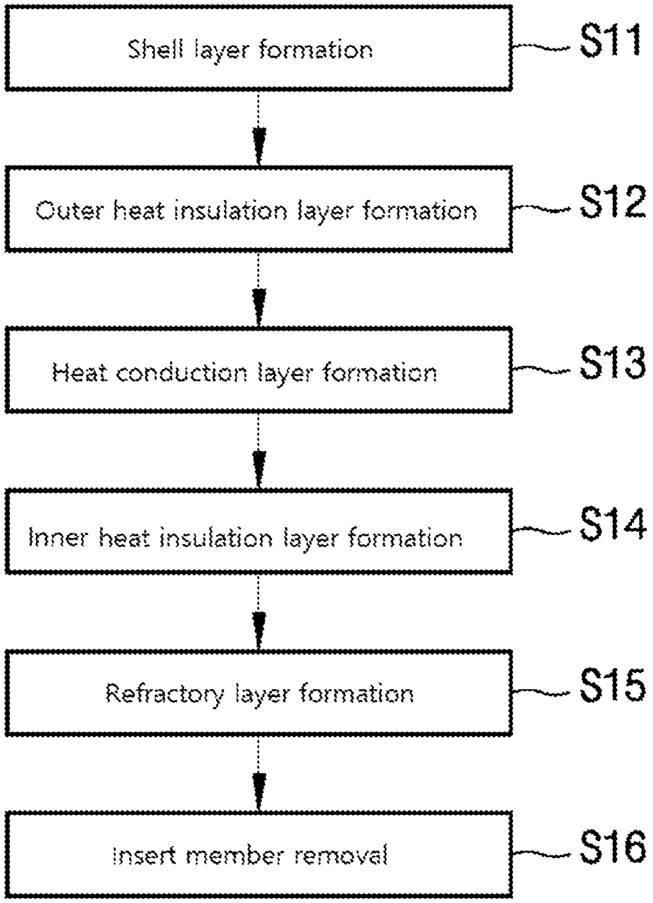

TUYERE STOCK, METHOD OF FABRICATING THE SAME, AND AIR BLAST SYSTEM FOR MELTING FURNACE

TECHNICAL FIELD

The present invention relates to a tuyere stock, a method of fabricating the same, and an air blast system for melting furnaces and, more particularly, to an air blast system for melting furnaces which allows real-time monitoring of damage to the tuyere stock, such as hot spot, cracking, and deformation of a flow channel defined therein, thereby preventing safety-related accidents while ensuring stable supply of hot air to a melting furnace, the tuyere stock for the air blast system and a method of fabricating the tuyere stock.

BACKGROUND ART

A melting furnace (commonly referred to as a "blast furnace") that produces molten iron by melting a raw material, such as iron ore, is supplied with air heated to about 1200° C. to 1400° C. as a heat source for melting the raw material.

An air blast device for supplying such hot air to the melting furnace includes a supply unit supplying air heated to high temperatures, a bustle pipe connected to the supply unit and having an annular shape to surround the melting furnace, and a tuyere stock connecting the bustle pipe to the melting furnace and supplying hot air distributed from the bustle pipe to the melting furnace.

In general, the tuyere stock connects the bustle pipe to a tuyere of the melting furnace in the form of an assembly of multiple pipes detachably connected to one another so as to meet requirements related to the relative angle and position between the bustle pipe and the tuyere of the melting furnace while ensuring constructability and maintainability.

The tuyere stock can be heated to higher temperatures in some regions than in the other regions. Such a temperature difference between different regions of the tuyere stock can lead to a difference in durability between the regions due to a difference in thermal expansion. Then, due to high-pressure hot air flowing through the inside of the tuyere stock, damage to the tuyere stock, such as hot spot or, even worse, cracking or deformation of a flow channel defined therein, can occur.

During melting of a raw material in the melting furnace, the temperature of hot air supplied to the melting furnace needs to be maintained in a proper range. If damage to the tuyere stock, such as cracking or deformation of the flow channel, occurs, melting performance can deteriorate due to inability to supply air having a proper temperature to the melting furnace.

In addition, cracks on the tuyere stock or the deformed flow channel can cause breakdown of the tuyere stock due to high-pressure hot air continuously supplied thereto, which can lead to breakdown of the entire facility as well as serious accidents.

Korean Patent Registration No. 0828154 (published on May 8, 2008) discloses a hot blast pipe cooling device which can prevent further damage to a hot blast stove through cooling based on early detection of overheating and hot spot of the hot blast stove.

DISCLOSURE

Technical Problem

Embodiments of the present invention are conceived to solve such problems in the art and it is an object of the present invention to provide an air blast system for melting furnaces which allows real-time monitoring of damage to a tuyere stock, such as hot spot, cracking, and deformation of a flow channel defined therein, thereby preventing safety-related accidents while ensuring stable supply of hot air to a melting furnace, the tuyere stock for the air blast system and a method of fabricating the tuyere stock.

It is another object of the present invention to provide a air blast system for melting furnaces which allows rapid and accurate measurement of the temperature of the tuyere stock using a temperature sensor module that can be installed in a compact manner in an environment difficult for an operator to access or not allowing temperature measurement, the tuyere stock for the air blast system and a method of fabricating the tuyere stock.

It will be understood that objects of the present invention are not limited to the above. The above and other objects of the present invention will become apparent to those skilled in the art from the detailed description of the following embodiments in conjunction with the accompanying drawings

Technical Solution

In accordance with one aspect of the present invention, a tuyere stock includes: a refractory layer having an inner surface defining a flow channel contacting hot air; a heat conduction layer disposed on an outer surface of the refractory layer and heated by heat transferred from the refractory layer; an outer heat insulation layer disposed on an outer surface of the heat conduction layer and blocking transfer of heat from the heat conduction layer to an outside environment or transfer of external heat to the heat conduction layer; and a temperature sensor detecting a temperature of the heat conduction layer.

The tuyere stock may further include: an inner heat insulation layer disposed between the refractory layer and the heat conduction layer, wherein the inner heat insulation layer may deform and undergo a sharp increase in thermal conductivity when a temperature of an inner surface of the inner heat insulation layer contacting the refractory layer exceeds a preset temperature.

The temperature sensor may detect a temperature of a temperature measurement region forming at least a portion of the heat conduction layer and the heat conduction layer may have a patterned portion forming at least a portion of the temperature measurement region.

The patterned portion may include: a first patterned portion having a first inner region connected to a sensing portion of the temperature sensor, a first outer region separated a first linear distance from the first inner region, and a first extension connecting the first inner region to the first outer region; and a second patterned portion having a second inner region connected to the sensing portion of the temperature sensor, a second outer region separated from the second inner region by a second linear distance longer than the first linear distance, and a second extension connecting the second inner region to the second outer region.

The first extension and the second extension may have the same length.

The first extension and the second extension may have different lengths, wherein the first extension may have a first thermal conductivity and the second extension may have a second thermal conductivity greater than the first thermal conductivity.

The first extension and the second extension may have different lengths, wherein the first extension may have a first area and the second extension may have a second area larger than the first area.

The heat conduction layer may further include: a heat collecting portion disposed in the first outer region or the second outer region to collect heat transferred from the refractory layer, wherein the heat collecting portion may include a material having greater thermal conductivity than the first patterned portion and the second patterned portion.

In accordance with one aspect of the present invention, a method of fabricating a tuyere stock includes: an outer heat insulation layer formation step in which an outer heat insulation layer is formed on an inner surface of a shell layer; a heat conduction layer formation step in which a heat conduction layer is formed on an inner surface of the outer heat insulation layer; a refractory layer formation step in which an insert member is inserted into an inner surface of the heat conduction layer, followed by formation of a refractory layer between the insert member and the heat conduction layer; and an insert member removal step in which the insert member is removed.

The method may further include: after the heat conduction layer formation step, an inner heat insulation layer formation step in which an inner heat insulation layer is formed on the inner surface of the heat conduction layer.

In the outer heat insulation layer formation step, a temperature sensor may be at least partially embedded in the outer heat insulation layer such that a sensing portion of the temperature sensor contacts the heat conduction layer.

In accordance with a further aspect of the present invention, an air blast system for melting furnaces includes: a supply unit supplying hot air into a melting furnace; a bustle pipe connected to the supply unit; the tuyere stock set forth above, the tuyere stock connecting the bustle pipe to the melting furnace to supply hot air from the bustle pipe to the melting furnace in a distributed manner; and a temperature management module determining whether the tuyere stock is damaged by comparing a temperature of the tuyere stock with a preset reference temperature.

The temperature management module may calculate, in real time, a temperature of the refractory layer contacting hot air based on the temperature of the heat conduction layer detected by the temperature sensor.

Advantageous Effects

According to the present invention, it is possible to rapidly and accurately detect and determine the location, occurrence time, and extent of damage to the tuyere stock, such as hot spot, cracking, and deformation of a flow channel defined therein, through real-time measurement and monitoring of the temperature of the tuyere stock and the temperature difference between different regions of the tuyere stock. In addition, through cooling of the tuyere stock or a prompt action by an operator or inspector based thereon, safety-related accidents can be prevented.

According to the present invention, it is possible to detect and determine leakage of hot air or heat out of the tuyere stock through real-time measurement and monitoring of the temperature of the tuyere stock and the temperature difference between different regions of the tuyere stock, thereby ensuring stable supply of hot air to the melting furnace and thus improving melting performance of the melting furnace.

According to the present invention, with the heat conduction layer connected to the sensing portion of the temperature sensor and extending along the surface of the temperature measurement region, it is possible to accurately measure and process information about the temperature of the tuyere stock, thereby allowing stable and systematic management of the tuyere stock based on the acquired temperature information.

It will be understood that advantageous effects of the present invention are not limited to the above and include any advantageous effects conceivable from the features disclosed in the detailed description of the present invention or the appended claims.

DESCRIPTION OF DRAWINGS

FIG. 1 is a side view of an air blast system for melting furnaces according to one embodiment of the present invention.

FIG. 2 is a plan view of the air blast system for melting furnaces according to the embodiment.

FIG. 3 is an exemplary view of a tuyere stock according to one embodiment of the present invention.

FIG. 4 is an exemplary view of a tuyere stock according to another embodiment of the present invention.

FIG. 5 is a plan view of a heat conduction layer according to one embodiment of the present invention.

FIG. 6 is a plan view of a patterned portion of the heat conduction layer according to a first embodiment of the present invention.

FIG. 7 is a plan view of a modification of the patterned portion of FIG. 6.

FIG. 8 is a plan view of a patterned portion of the heat conduction layer according to a second embodiment of the present invention.

FIG. 9 is a plan view of a patterned portion of the heat conduction layer according to a third embodiment of the present invention.

FIG. 10 is a plan view of a patterned portion of the heat conduction layer according to a fourth embodiment of the present invention.

FIG. 11 is a flowchart of a tuyere stock fabrication method according to one embodiment of the present invention.

BEST MODE

Hereinafter, preferred embodiments of the present invention will be described with reference to the accompanying drawings. In description of the embodiments, the same components will be denoted by the same terms and the same reference numerals and repeated description thereof will be omitted.

FIG. 1 is a side view of an air blast system for melting furnaces according to one embodiment of the present invention, FIG. 2 is a plan view of the air blast system for melting furnaces according to the embodiment, and FIG. 3 is an exemplary view of a tuyere stock according to one embodiment of the present invention.

Referring to FIG. 1 to FIG. 3, the air blast system for melting furnaces according to this embodiment can achieve real-time monitoring of the temperature of a tuyere stock 40 and damage to the tuyere stock 40, such as hot spot, cracking, and deformation of a flow channel defined therein, can prevent safety-related accidents through prompt action by an operator or inspector based on determination that the tuyere stock 40 is damaged, and can ensure stable delivery of hot gas to a melting furnace 10.

The air blast system for melting furnaces according to this embodiment may include a melting furnace 10, a supply unit 20, a bustle pipe 30, a tuyere stock 40, and a temperature management module 60.

The melting furnace 10 has a melting space, into which a raw material produced by a sintering process and hot air are introduced to produce molten iron.

The melting furnace 10 may be formed around a base thereof with a tuyere through which hot air is supplied into the melting furnace 10. The tuyere may include multiple tuyeres spaced apart from one another along a circumference of the melting furnace 10.

The supply unit 20 serves to supply hot air to the melting furnace 10 and may force hot air heated by a heater into the bustle pipe 30. As the supply unit 20, a pump may be used.

The bustle pipe 30 is connected to the supply unit 20 to deliver the hot air forced from the supply unit 20 to the tuyere stock 40.

The bustle pipe 30 may have an annular shape to surround the melting furnace 10.

The tuyere stock 40 connects the bustle pipe 30 to the melting furnace 10 to supply the hot air from the bustle pipe 30 to the melting furnace 10 in a distributed manner.

The tuyere stock 40 may include multiple tuyere stocks 40 spaced apart from one another along the circumference of the melting furnace 10 with respect to the annular bustle pipe 30. The multiple tuyere stocks 40 may be connected to respective tuyeres of the melting furnace 10.

Accordingly, the hot air can be uniformly distributed along the circumference of the melting furnace 10 through the multiple tuyere stocks 40 before being supplied into the melting furnace 10.

The tuyere stock 40 may include an upper pipe 40A, a lower pipe 40B, an elbow pipe 40C, and a blow pipe 40D.

The upper pipe 40A may be connected at one end thereof to the bustle pipe 30. In addition, the upper pipe 40A may extend obliquely from the bustle pipe 30 toward the tuyere of the melting furnace 10.

The lower pipe 40B may be connected at one end thereof to the upper pipe 40A. In addition, the lower pipe 40B may extend obliquely from the upper pipe 40A toward the tuyere of the melting furnace 10.

The elbow pipe 40C may be connected at one end thereof to the lower pipe 40A and may be bent at the other end thereof to horizontally face the tuyere of the melting furnace 10.

The blow pipe 40D may be connected at one end thereof to the elbow pipe 40C and may be inserted at the other end thereof into the tuyere of the melting furnace 10 to extend into the melting space of the melting furnace 10.

In order to satisfy the angle and position requirements of the blow pipe 40D inserted into and mounted on the tuyere of the melting furnace 10, the upper pipe 40A, the lower pipe 40B, the elbow pipe 40*c*, and the blow pipe (40D), constituting the tuyere stock 40, may be detachably coupled to one another.

In addition, at least one of the upper pipe 40A, the lower pipe 40B, the elbow pipe 40C, and the blow pipe 40D may have a structure that can absorb displacement due to impact in an axial direction thereof, which is parallel to a flow direction of hot air, or impact in a transverse direction thereof. For example, at least one of the upper pipe 40A, the lower pipe 40B, the elbow pipe 40C, and the blow pipe 40D may have a bellows connection. In this way, the tuyere stock 40 can effectively absorb displacement due to impact of high-pressure hot air during use.

The tuyere stock 40 may include a temperature sensor 50.

The temperature sensor 50 may detect the temperature of the tuyere stock 40 in real time.

The temperature sensor 50 may have a contact-type sensing portion 51 (see FIG. 6) for temperature measurement.

In one embodiment, the temperature sensor 50 may include a thermocouple having the sensing portion 51 as a hot junction and a processor connected to a cold junction of the thermocouple and performing temperature calculation from thermoelectromotive force depending on the temperature of the thermocouple. Specifically, the thermocouple consists of two wires of different metals joined at both ends such that current flows between the wires due to a temperature difference between a hot junction (a junction at the temperature to be measured), which is one contact point between the wires, and a cold junction (a junction at a fixed temperature), which is the other contact point between the wires. Here, the hot junction of the thermocouple may correspond to the sensing portion 51. The thermocouple including the hot junction may be embedded in and protected by a cover member such as a tube. The processor may acquire information about an actual temperature at the hot junction from relation between thermoelectromotive force generated by the thermocouple and a temperature difference between the hot junction and the cold junction of the thermocouple. As the processor, a voltmeter may be used. However, it should be understood that the present invention is not limited thereto and the temperature sensor 50 may include various other well-known temperature sensors apart from the thermocouple depending on the type of heat source to be measured.

The temperature sensor 50 may further include a first communication unit. The first communication unit may transmit temperature information measured and processed by the temperature sensor 50 to the temperature management module 60, and may receive a control signal from the temperature management module 60.

Multiple temperature sensors 50 may be provided to each of the multiple tuyere stocks 40, such that one temperature sensor 50 can be disposed in each temperature measurement region A, which forms at least a portion of a heat conduction layer 42 of each tuyere stock 40 contacting a refractory layer 41 of the tuyere stock 40.

The temperature management module 60 may determine damage to the tuyere stock 40, such as hot spot, cracking, and deformation of a flow channel defined in the tuyere stock 40 based on comparison of the temperature of the tuyere stock 40 detected by the temperature sensor 50 with a preset reference temperature, and may inform an operator or inspector of results of determination.

In addition, the temperature management module 60 may operate a cooling module or may perform an emergency shutdown of the air blast system for melting furnaces when a determination is made that the tuyere stock 40 is damaged.

The temperature management module 60 may include a second communication unit. The second communication unit may receive temperature information measured and processed by the temperature sensor 50, and may transmit a control signal to the temperature sensor 50. In addition, the temperature management module 60 may process the temperature information measured and processed by the temperature sensor 50, and may display the processed temperature information in the form of various outputs. Accordingly, a manager can effectively manage the operating state of the tuyere stock 40 through real-time monitoring of the temperature information displayed on the temperature management module 60.

The temperature management module 60 may be a computer, or may be a tablet computer or smartphone that a manager can carry.

In use of the tuyere stock 40, a temperature difference can occur between different regions of the tuyere stock 40. For example, a region of the upper pipe 40A connected to the bustle pipe 30 can be heated to relatively high temperatures. Such a temperature difference between different regions of the tuyere stock 40 can cause a durability difference between the regions due to a difference in thermal expansion or thermal contraction. As a result, damage to the tuyere stock 40, such as hot spot or, even worse, cracking or deformation of the flow channel, can occur due to hot air flowing in the tuyere stock 40. According to the present invention, since the temperature condition of each tuyere stock 40 and the temperature difference between different regions of each tuyere stock 40 can be measured and monitored in real time using the temperature sensor 50, it is possible to prevent overheating of the tuyere stock 40 or to compensate for the temperature difference between different regions of the tuyere stock 40 by operating a cooling module before damage to the tuyere stock 40 occurs. In addition, it is possible to provide an operator or inspector with information for prompt action.

Further, the air blast system for melting furnaces according to this embodiment can more rapidly and accurately detect and determine the location, occurrence time, and extent of damage to the tuyere stock 40, thereby ensuring stable and quick management of the tuyere stock 40.

Next, a tuyere stock according to one embodiment of the present invention will be described in detail.

Referring to FIG. 3, the tuyere stock 40 according to this embodiment may consist of a refractory layer 41, a heat conduction layer 42, an outer heat insulation layer 43, and a shell layer 44.

The refractory layer 41 directly contacts hot air passing through the tuyere stock 40 and may have an inner surface defining a flow channel S that contacts the hot air.

The refractory layer 41 may be formed of a material having good heat resistance and may have a preset refractory temperature. If the refractory layer 41 stays at a temperature exceeding the refractory temperature for a certain period of time due to hot air, cracking of the refractory layer 41 or deformation of the flow channel can occur. Then, heat resistance of the refractory layer 41 can sharply deteriorate, causing leakage of hot air or heat out of the tuyere stock.

The heat conduction layer 42 may be formed of a material having good thermal conductivity, such as a metal, and may be disposed on an outer surface of the refractory layer 41. Accordingly, the heat conduction layer 42 can be heated to higher temperatures by heat transferred from the refractory layer 41.

The outer heat insulation layer 43 may be formed of an insulating material and may be disposed on an outer surface of the heat conduction layer 42. Accordingly, the outer heat insulation layer 43 can block transfer of heat from the heat conduction layer 42 to an outside environment or transfer of external heat to the heat conduction layer 42.

The shell layer 44 may be disposed on an outer surface of the outer heat insulation layer 43 and may define an outer shape of the tuyere stock 40. The shell layer 44 may be formed of a metal such as iron to protect the tuyere stock 40 from external impact.

Here, the temperature sensor 50 may be disposed in the outer heat insulation layer 43 such that the sensing portion 51 of the temperature sensor 50 disposed in the outer heat insulation layer 43 contacts the heat conduction layer 42. Accordingly, the temperature sensor 50 may detect the temperature of the heat conduction layer 42 and may send the detected temperature data to the temperature management module 60.

Thus, the temperature management module 60 can provide real-time determination of a temperature distribution over the entire region of the refractory layer 41 contacting hot air based on the temperature of the heat conduction layer 42 detected by the multiple temperature sensors 50.

Although FIG. 3 only shows a sectional structure of the upper pipe 40A of the tuyere stock 40, each of the lower pipe 40B, the elbow pipe 40C, and the blow pipe 40D may also have the same sectional structure as the upper pipe 40A.

Since the heat conduction layer is disposed on the refractory layer 41 to be heated by heat transferred from the refractory layer 41 and the temperature sensor 50 is disposed opposite the refractory layer 41 with respect to the heat conduction layer 42, it is possible to rapidly and accurately measure changes in temperature of the heat conduction layer 42 while preventing deterioration in durability of the temperature sensor 50 due to hot air. Accordingly, the temperature management module 60 can immediately measure and determine the location, occurrence time, extent of damage to the refractory layer 41 based on comparison of the temperature of the heat conduction layer 42 detected by the temperature sensor 50 with a preset reference temperature. Thus, the air blast system for melting furnaces according to the present invention can stably supply hot air to the melting furnace 10 while preventing accidents due to damage to the tuyere stock 40.

The air blast system for melting furnaces according to this embodiment may further include a cooling module.

The cooling module may include a cooling channel and a refrigerant supply unit.

The cooling channel may be disposed in the tuyere stock 40, specifically, in the refractory layer 41.

The refrigerant supply unit may force a refrigerant to circulate along the cooling channel. Accordingly, when the temperature of the tuyere stock 40 detected by the temperature sensor 50 exceeds the preset reference temperature, the temperature management module 60 can cool the tuyere stock 40 by operating the cooling module.

Multiple cooling modules may be individually disposed in each temperature measurement region A in which the temperature sensor 50 is disposed. Accordingly, it is possible to individually cool different regions of the tuyere stock 40, between which a temperature difference occurs, thereby suppressing a temperature gradient across the tuyere stock 40.

The temperature management module 60 may have a preset cooling module operating temperature. Here, the cooling module operating temperature may be set to be lower than the reference temperature. That is, when the temperature of the heat conduction layer 42 detected by the temperature sensor 50 reaches the cooling module operating temperature before reaching the reference temperature, the temperature management module 60 may operate the cooling module to cool the tuyere stock 40 based on determination that the tuyere stock 40 has overheated. Accordingly, it is possible to prevent damage to the tuyere stock 40, such as cracking of the tuyere stock 40 or deformation of the flow channel.

FIG. 4 is an exemplary view of a tuyere stock according to another embodiment of the present invention.

Referring to FIG. 4, the tuyere stock 40 according to this embodiment may further include an inner heat insulation layer 45 disposed between the refractory layer 41 and the heat conduction layer 42.

The inner heat insulation layer 45 may suppress excessive heat transfer from the refractory layer 41 to the heat conduction layer 42 at normal times. Accordingly, the tuyere stock 40 including the inner heat insulation layer 45 allows the heat conduction layer 42 to have a relatively low temperature, as compared with the tuyere stock without the inner heat insulation layer 45.

In addition, when the temperature of an inner surface of the inner heat insulation layer 45 contacting the refractory layer 41 exceeds a preset temperature, the inner heat insulation layer 45 may deform and undergo a sharp increase in thermal conductivity. As a result, heat transferred from the refractory layer 41 to the inner heat insulation layer 45 is rapidly transferred to the heat conduction layer 42 and thus can rapidly heat the heat conduction layer 42.

The tuyere stock including the inner heat insulation layer 45 allows the temperature of the heat conduction layer 42 to change drastically and rapidly upon occurrence of damage to the refractory layer 41, as compared with the tuyere stock without the inner heat insulation layer 45.

Accordingly, the temperature sensor 50 can more accurately and rapidly measure changes in temperature of the heat conduction layer 42. In addition, it is possible to accurately measure the temperature of the heat conduction layer 42 even using a relatively inexpensive temperature sensor 50.

As the inner heat insulation layer 45, a vacuum insulation panel may be used. The vacuum insulation panel has good insulation properties. However, the vacuum insulation panel undergoes a sharp decrease in insulation properties when a vacuum therein is broken.

FIG. 5 is a plan view of a heat conduction layer according to one embodiment of the present invention.

Referring to FIG. 5, the heat conduction layer 420 according to this embodiment may have a temperature measurement region A connected to the sensing portion 51 (see FIG. 6) of the temperature sensor 50 while contacting the refractory layer 41.

The temperature measurement region A may be a region defined by a virtual outline extending along an edge of the heat conduction layer 420. The temperature measurement region 200A of the heat conduction layer 420 may be divided into multiple temperature measurement regions A by virtual division lines.

The heat conduction layer 420 may collect heat transferred from the refractory layer 41 to the temperature measurement region A and may transmit the collected heat to the sensing portion 51 of the temperature sensor 50 along a surface of the temperature measurement region A.

In addition, the heat conduction layer 420 may have a patterned portion. The patterned portion may have a generally uniform pattern centered on the sensing portion 51 and extending to an edge of the temperature measurement region A. The patterned portion may form at least a portion of the temperature measurement region A. That is, the heat conduction layer 420 may completely cover the outer heat insulation layer 43 in plan view, wherein the patterned portion may cover only a portion of the outer heat insulation layer 43.

Next, the heat conduction layer having a patterned portion according to various embodiments of the present invention will be described in detail with reference to FIG. 6 to FIG. 10.

FIG. 6 is a plan view of a patterned portion of the heat conduction layer according to a first embodiment of the present invention.

Referring to FIG. 6, the heat conduction layer 420 according to this embodiment may have a patterned portion, wherein the patterned portion may include a first patterned portion 420A and a second patterned portion 420B.

The first patterned portion 420A may have a first inner region 421A, a first outer region 422A, and a first extension 423A.

The first inner region 421A may be disposed at a center of the temperature measurement region A and may be connected to the sensing portion 51 of the temperature sensor 50.

The first outer region 422A may be disposed at an outer edge of the temperature measurement region A and may be separated from the first inner region 421A by a first linear distance d1.

The first extension 423A may connect the first inner region 421A to the first outer region 422A. The first extension 423A may have the same length as the first linear distance d1, or may have a longer length than the first linear distance d1. For example, the first extension 423A may extend from the first inner region 421A to the first outer region 422A in an irregular shape such as a zigzag shape or an arc shape in plan view.

The second patterned portion 420B may have a second inner region 421B, a second outer region 422B, and a second extension 423B.

The second inner region 421B may be disposed at the center of the temperature measurement region A and may be connected to the sensing portion 51 of the temperature sensor 50.

The second outer region 422B may be disposed at the outer edge of the temperature measurement region A and may be separated from the second inner region 421B by a second linear distance d2. Here, the second linear distance d2 may be longer than the first linear distance d1.

The second extension 423B may connect the second inner region 421B to the second outer region 422B. The second extension 423B may have the same length as the second linear distance d2, or may have a longer length than the second linear distance d2. For example, the second extension 423B may extend from the second inner region 421B to the second outer region 422B in an irregular shape such as a zigzag shape or an arc shape in plan view.

According to this embodiment, regardless of the difference between the first linear distance d1 and the second linear distance d2, the first extension 423A and the second extension 423B may have the same length L1. That is, since there is a difference between the first linear distance d1 and the second linear distance d2, the first extension 423A and the second extension 423B extend in different shapes to have the same length L1, as shown in FIG. 6.

By setting the lengths of the first extension 423A and the second extension 423B to the same value L1, it is possible to compensate for a difference between a heat transfer rate from the first outer region 422A to the sensing portion 51 and a heat transfer rate from the second outer region 422B to the sensing portion 51 due to the difference between the linear distances d1, d2.

In addition, heat transferred to the first outer region 422A, which is separated from the sensing portion 51 by the first linear distance d1, and heat transferred to the second outer region 422B, which is separated from the sensing portion 51 by the second linear distance d1, can reach the sensing portion 51 at the same time after moving along the first extension 423A and the second extension 423B, respectively. Accordingly, the temperature sensor 50 can rapidly and accurately measure the temperature of the temperature measurement region A in a specific amount of time.

When the temperature measurement region A of the heat conduction layer 420 has a square shape in plan view and the sensing portion 51 is disposed at the center of the temperature measurement region A, as shown in FIG. 6, heat transferred to a side of the temperature measurement region, which is relatively close to the sensing portion 51, and heat transferred to a corner of the temperature measurement region, which is relatively far from the sensing portion 51, can reach the sensing portion 51 at the same time after moving along the first extension 423A and the second extension 423B, respectively.

FIG. 7 is a plan view of a modification of the patterned portion of FIG. 6.

Referring to FIG. 7, an interference structure ST may be disposed at a center of the temperature measurement region A defined by the heat conduction layer 420 depending on the type of heat source or the condition of the refractory layer 41 receiving the heat source. Accordingly, the sensing portion 51 of the temperature sensor 50 needs to be disposed offset from the center of the temperature measurement region 200A.

Even when the sensing portion 51 of the temperature sensor 50 is disposed offset from the center of the temperature measurement region A, it is possible to compensate for a difference between a heat transfer rate from the first outer region 422A to the sensing portion 51 and a heat transfer rate from the second outer region 422B to the sensing portion 51 due to the difference between the linear distances d1, d2 by setting the lengths of a first extension 4230A and a second extension 4230B to the same value L1, as described above.

In addition, heat transferred to the first outer region 422A, which is separated from the sensing portion 51 by the first linear distance d1, and heat transferred to the second outer region 422B, which is separated from the sensing portion 51 by the second linear distance d2, can reach the sensing portion 51 at the same time after moving along the first extension 4230A and the second extension 4230B, respectively.

FIG. 8 is a plan view of a patterned portion of the heat conduction layer according to a second embodiment of the present invention.

Referring to FIG. 8, the patterned portion according to this embodiment may include a first patterned portion 420A and a second patterned portion 420B, like the patterned portion described above. In addition, the first patterned portion 420A may have a first inner region 421A, a first outer region 422A, and a first extension 4231A, and the second patterned portion 420B may have a second inner region 421B, a second outer region 422B, and a second extension 4231B. Repeated description thereof will be omitted.

According to this embodiment, the first extension 4231A and the second extension 4231B have different lengths corresponding to the difference between the first linear distance d1 and the second linear distance d2. Here, the first extension 4231A and the second extension 4231B may be formed of different materials having different thermal conductivities. That is, the first extension 4231A may have a first thermal conductivity λ1 and the second extension 4231B may have a second thermal conductivity λ2 greater than the first thermal conductivity λ1.

By setting the thermal conductivities of the first extension 4231A and the second extension 4231B to different values, it is possible to compensate for a difference between a heat transfer rate from the first outer region 422A to the sensing portion 51 and a heat transfer rate from the second outer region 422B to the sensing portion 51 due to the difference between the linear distances d1, d2.

FIG. 9 is a plan view of a patterned portion of the heat conduction layer according to a third embodiment of the present invention.

Referring to FIG. 9, the patterned portion according to this embodiment may include a first patterned portion 420A and a second patterned portion 420B, like the patterned portion described above. In addition, the first patterned portion 420A may have a first inner region 421A, a first outer region 422A and a first extension 4232A, and the second patterned portion 420B may have a second inner region 421B, a second outer region 422B and a second extension 4232B. Repeated description thereof will be omitted.

According to this embodiment, the first extension 4232A and the second extension 4232B may have different lengths corresponding to the difference between the first linear distance d1 and the second linear distance d2. Here, the first extension 4232A and the second extension 4232B may have different areas. That is, the first extension 4232A may have a first area A1 and the second extension 4232B may have a second area A2 larger than the first area A1.

By setting the areas of the first extension 4232A and the second extension 4232B to different values, it is possible to compensate for a difference between a heat transfer rate from the first outer region 422A to the sensing portion 51 and a heat transfer rate from the second outer region 422B to the sensing portion 51 due to the difference between the linear distances d1, d2.

FIG. 10 is a plan view of a patterned portion of the heat conduction layer according to a fourth embodiment of the present invention.

Referring to FIG. 10, the patterned portion according to this embodiment may include a first patterned portion 420A and a second patterned portion 420B, like the patterned portion described above. The first patterned portion 420A may have a first inner region 421A, a first outer region 422A and a first extension 4233A, and the second patterned portion 420B may have a second inner region 421B, a second outer region 421B and a second extension 4233B. In addition, the first patterned portion 420A may further have a first heat collecting portion 425A disposed in the first outer region 422A, and the second patterned portion 420B may further have a second heat collecting portion 425B disposed in the second outer region 422B.

According to this embodiment, the first extension 4233A and the second extension 4233B may have different lengths corresponding to the difference between the first linear distance d1 and the second linear distance d2. Here, the first heat collecting portion 425A and the second heat collecting portion 425B may be formed of different materials having different thermal conductivities. That is, the first heat collecting portion 425A may have a third thermal conductivity and the second heat collecting portion 425B may have a fourth thermal conductivity greater than the third thermal conductivity.

By setting a temperature difference between the first inner region 421A and the first outer region 422A differently from a temperature difference between the second inner region 421B and the second outer region 422B through disposition of different materials having different thermal conductivities in the first outer region 422A and the second outer region 422B, respectively, it is possible to compensate for a difference between a heat transfer rate from the first outer region 422A to the sensing portion 51 and a heat transfer rate from the second outer region 422B to the sensing portion 51 due to the difference between the linear distances d1, d2.

In addition, due to the presence of the first heat collecting portion 425A and the second heat collecting portion 425B, heat in the refractory layer 41 can more rapidly reach the sensing portion 51 after being transferred to the outer region of the heat conduction layer 420.

In the embodiments described with reference to FIG. 6 to FIG. 10, settings for the lengths, thermal conductivities, and areas of the first extension 423A and the second extension 423B are described as being regulated individually during formation of the first patterned portion 420A and the second patterned portion 420B. However, it should be understood that the present invention is not limited thereto and compensation for the difference between heat transfer rates through the first extension 423A and the second extension 423B may be achieved by regulating at least one of the settings for the lengths, thermal conductivities, and areas of the first extension 423A and the second extension 423B during formation of the first patterned portion 420A and the second patterned portion 420B. In addition, the settings for the lengths, thermal conductivities, and areas of the patterned portions of the heat conduction layer 420 may be appropriately varied depending on the type of refractory layer 41 and the installation position of the sensing portion 51.

In yet another embodiment (not shown), the heat conduction layer 420 does not have any patterned portion and may be in the form of a flat plate corresponding in shape to the temperature measurement region A.

That is, the temperature measurement region A according to this embodiment may have a circular shape, wherein the sensing portion 51 of the temperature sensor 50 may be disposed at a center of the temperature measurement region A. In addition, the heat conduction layer 200 may have a circular shape having a constant radius about the sensing portion 51, corresponding to the circular temperature measurement region 200A.

Despite having no patterned portion, the circular heat conduction layer 420 having a constant radius about the sensing portion 51 can ensure a uniform heat transfer rate from an outer region of the heat conduction layer 420 to the sensing portion 51. In addition, heat transferred from the refractory layer 41 to different points of the outer region of the heat conduction layer 420 can reach an inner region connected to the sensing portion 51 at the same time.

However, it should be understood that the present invention is not limited thereto and the circular heat conduction layer 420 having a constant radius about the sensing portion 51 may also have a patterned portion. Here, the patterned portion may have a radial pattern consisting of multiple sections extending from the inner region connected to the sensing portion 51 to the outer region and having the same length, area, and thermal conductivity. Accordingly, heat transferred from the refractory layer 41 to the outer region of the heat conduction layer 420 can more rapidly reach the inner region connected to the sensing portion 51.

FIG. 11 is a flowchart of a tuyere stock fabrication method according to one embodiment of the present invention.

Referring to FIG. 11, the tuyere stock fabrication method according this embodiment may include a shell layer formation step S11, an outer heat insulation layer formation step S12, a heat conduction layer formation step S13, an inner heat insulation layer formation step S14, a refractory layer formation step S15, and an insert member removal step S16.

In the shell layer formation step S11, a shell layer 44 is formed.

In the outer heat insulation layer formation step S12, an outer heat insulation layer 43 is formed on an inner surface of the shell layer 44.

In the outer heat insulation layer formation step S12, a temperature sensor 50 may be integrally assembled with the outer heat insulation layer 43. That is, in the course of forming the outer heat insulation layer 43, the temperature sensor 50 may be at least partially embedded in the outer heat insulation layer 43 such that the sensing portion 51 of the temperature sensor 50 is exposed over an inner surface of the outer heat insulation layer 43. Accordingly, the temperature sensor 50 can measure the temperature of a heat conduction layer 42 formed on the inner surface of the outer heat insulation layer 43.

In the heat conduction layer formation step S13, the heat conduction layer 42 is formed on the inner surface of the outer heat insulation layer 43.

As described above, the heat conduction layer 420 may have various patterned portions as shown in FIG. 5 to FIG. 10.

In the inner heat insulation layer formation step S14, an inner heat insulation layer 45 is formed on an inner surface of the heat conduction layer 42. In the refractory layer formation step S15, an insert member corresponding in shape to a flow channel S is inserted into the inner surface of the heat conduction layer 42, followed by formation of a refractory layer 41 between the insert member and the heat conduction layer 42. Accordingly, when formation of the refractory layer 41 is completed, the flow channel S through which hot air will flow is defined on the inner surface of the refractory layer 41.

In the insert member removal step S16, the insert member is removed. That is, the insert member is removed after formation of the refractory layer 41, thereby completing fabrication of a tuyere stock 40.

Each of the upper pipe 40A, the lower pipe 40B, the elbow pipe 40C, and the blow pipe 40D may have the shell layer 44, the outer heat insulation layer 43, the heat conduction layer 42, the inner heat insulation layer 45, and the refractory layer 41 as described above. The upper pipe 40A, the lower pipe 40B, the elbow pipe 40C, and the blow pipe 40D may be fabricated separately and then may be appropriately assembled on site using a separate fastening member depending on the relative position and angle between the bustle pipe 30 and the melting furnace 10.

Although exemplary embodiments have been described herein, it should be understood that these embodiments are provided for illustration only and are not to be construed in any way as limiting the present invention, and that various modifications, changes, or alterations can be made by those skilled in the art without departing from the spirit and scope of the invention.

INDUSTRIAL APPLICABILITY

The air blast system for melting furnaces according to the present invention can rapidly and accurately detect and determine the location, occurrence time, and extent of damage to a tuyere stock, which is key equipment of a melting furnace, such as hot spot, cracking, or flow channel deformation, through real-time measurement and monitoring of the temperature of the tuyere stock and the temperature difference between different regions of the tuyere stock, thereby improving melting performance of the melting furnace while preventing safety-related accidents that can occur in a melting furnace facility. Thus, the air blast system for melting furnaces according to the present invention can be widely used in the field of melting furnaces.

The invention claimed is:

1. A tuyere stock comprising:

a refractory layer having an inner surface defining a flow channel contacting hot air;

a heat conduction layer disposed on an outer surface of the refractory layer and heated by heat transferred from the refractory layer;

an outer heat insulation layer disposed on an outer surface of the heat conduction layer and blocking transfer of heat from the heat conduction layer to an outside environment or transfer of external heat to the heat conduction layer;

a temperature sensor detecting a temperature of the heat conduction layer; and an inner heat insulation layer disposed between the refractory layer and the heat conduction layer, wherein the inner heat insulation layer deforms and undergoes a sharp increase in thermal conductivity when a temperature of an inner surface of the inner heat insulation layer contacting the refractory layer exceeds a preset temperature.

2. The tuyere stock according to claim 1, wherein the temperature sensor detects a temperature of a temperature measurement region forming at least a portion of the heat conduction layer, and the heat conduction layer has a patterned portion forming at least a portion of the temperature measurement region.

3. The tuyere stock according to claim 2, wherein the patterned portion comprises:

a first patterned portion having a first inner region connected to a sensing portion of the temperature sensor, a first outer region separated by a first linear distance from the first inner region, and a first extension connecting the first inner region to the first outer region; and a second patterned portion having a second inner region connected to the sensing portion of the temperature sensor, a second outer region separated from the second inner region by a second linear distance longer than the first linear distance, and a second extension connecting the second inner region to the second outer region.

4. The tuyere stock according to claim 3, wherein the first extension and the second extension have the same length.

5. The tuyere stock according to claim 3, wherein the first extension and the second extension have different lengths, the first extension having a first thermal conductivity, and the second extension having a second thermal conductivity greater than the first thermal conductivity.

6. The tuyere stock according to claim 3, wherein the first extension and the second extension have different lengths, the first extension having a first area, and the second extension having a second area larger than the first area.

7. The tuyere stock according to claim 3, wherein the heat conduction layer further comprises: a heat collecting portion disposed in the first outer region or the second outer region to collect heat transferred from the refractory layer, the heat collecting portion comprising a material having greater thermal conductivity than the first patterned portion and the second patterned portion.

8. An air blast system for melting furnaces, comprising:

a supply unit supplying hot air into a melting furnace;

a bustle pipe connected to the supply unit;

the tuyere stock according to claim 1, the tuyere stock connecting the bustle pipe to the melting furnace to supply hot air from the bustle pipe to the melting furnace in a distributed manner; and a temperature management module determining whether the tuyere stock is damaged by comparing a temperature of the tuyere stock with a preset reference temperature.

9. The air blast system according to claim 8, wherein the temperature management module calculates, in real time, a temperature of the refractory layer contacting hot air based on the temperature of the heat conduction layer detected by the temperature sensor.

* * * * *